Dec. 14, 1965 D. SHALER ETAL 3,223,824
RECORDER DRYING MECHANISM
Filed Jan. 16, 1964 2 Sheets-Sheet 1

INVENTORS
DAVID SHALER
RALPH A. VARRICHIO
BY
Edward T Connors
Attorney

United States Patent Office 3,223,824
Patented Dec. 14, 1965

3,223,824
RECORDER DRYING MECHANISM
David Shaler, Waldwick, N.J., and Ralph A. Varrichio, Brooklyn, N.Y., assignors to Hogan Faximile Corporation, New York, N.Y.
Filed Jan. 16, 1964, Ser. No. 338,148
6 Claims. (Cl. 219—200)

The present invention relates to electrolytic facsimile recorders and more particularly to an improved mechanism for drying recorded electrolytic medium.

Electrolytic recording is the art of producing copy by means of the electrolytic action of an electric current upon a properly sensitized medium such as a paper sheet or strip. The original copy is scanned line-by-line in any well-known manner to cause variations to be set up in a photo-electric cell responsive to variations in the density along the line. The ouput of the photo-electric cell is amplified and utilized, usually at a remote point, to form marks on electrolytic paper with corresponding density variations.

In slow speed recorders the mark is made by passing the recording paper between a rotating helical electrode and a fixed linear electrode. In such a recorder a line is recorded for each revolution of the helical electrode. Thus with a recording resolution of one hundredth of an inch per scan, the speed of recording is limited to a maximum practical speed of about nine tenths of an inch per minute.

In high speed recorders rates of recording of six hundred inches per minute are possible, or over six hundred times the practical recording rate of slow speed helical type recorders. Such high rates of recording are possible by the use of multi-styli recorders made by the Hogan Faximile Corporation, New York, New York. In the multi-styli recorder about one hundred or more styli per inch are positioned in a line across the recording paper over a linear electrode. Inasmuch as each styli can record at the same rate, or even faster, than the rate of the single recording spot of the helical electrode recorder, very high recording speeds are possible.

The recording paper may be of the type disclosed in U.S. Patent No. 2,358,839 to Wagner in which the paper is impregnated with a polyhydroxy phenolic compound and an electrolyte. The normally colorless impregnant has the characteristic of forming a colored mark with iron which is supplied by the linear electrode or anode under the action of the marking current passing through the electrolite while the paper is in a moistened condition.

After the paper has been marked it is necessary to remove the moisture. Inasmuch as the rate of drying of the recording medium depends upon the rate of application of heat, it is obvious that the heating power of the dryer for the multi-styli recorder must be considerable. With such a large amount of power and because of the inherent thermal inertia of the heating bars, it has been found that it is necessary to bring the heater bars up to temperature before recording is started. In the event the paper were to be in stationary contact with the heater bars for an appreciable time it would become scorched as would occur upon the stopping of the recording, inasmuch, as stated before, the stored heat in the heater bars is sufficient to char the recording medium.

A construction to overcome this difficulty is shown in U.S. Patent No. 3,100,252, titled "Recorder Drying Mechanism," issued August 6, 1963, to David Shaler et al. In the patented construction an electrical heater drying mechanism is shown which is so arranged that it may be moved into contact and away from contact with the recording paper.

In accordance with the present invention an improved construction is provided in which the heater units remain stationary and a lifter mechanism is used to raise the recording paper away from contact with the heating units during periods of non-recording.

The construction in accordance with the invention is advantageous in that the lifting mechanism is appreciably lighter than the heating units and thus may be moved with a smaller power unit. Further, the heating units may be fixedly positioned so that alignment is maintained such that the recording paper is dried without wrinkling.

Other objects and advantages of the invention will be apparent from the following description and from the accompanying drawings which show, by way of example, an embodiment of the invention.

Figure 1:
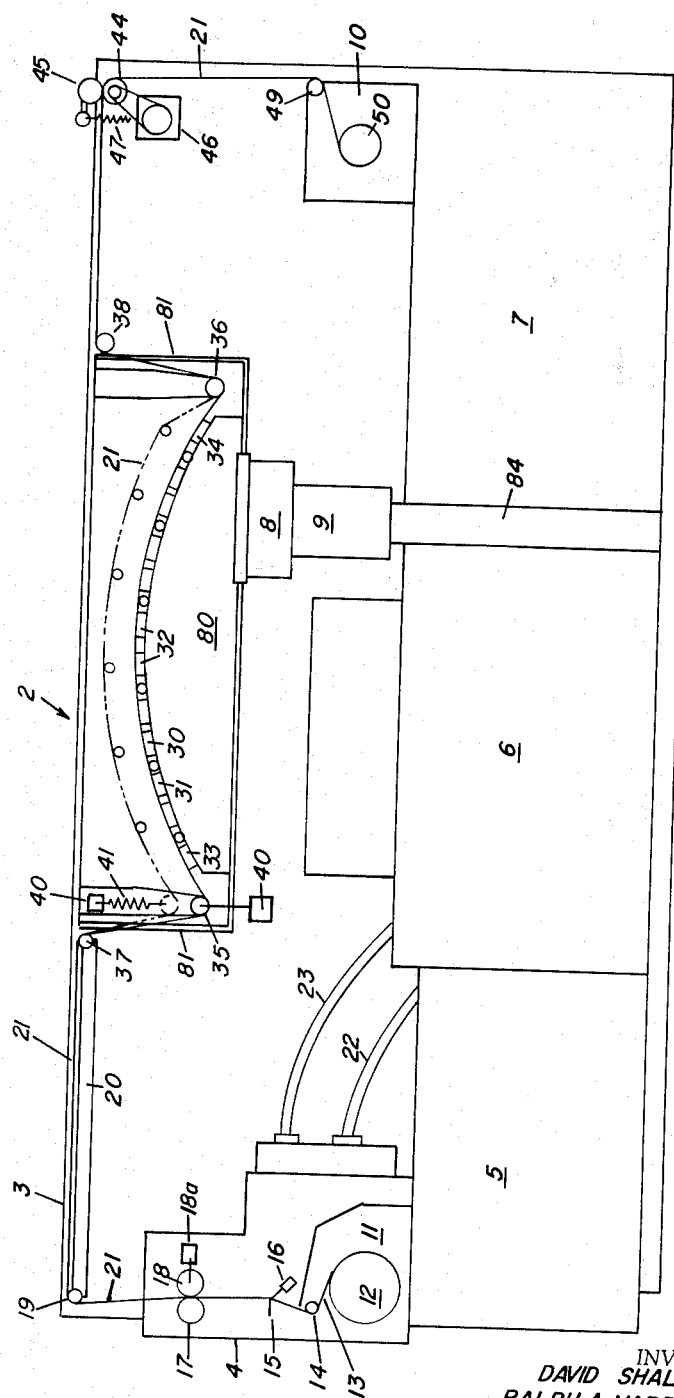
FIGURE 1 is a side view of a facsimile recorder incorporating a drying mechanism in accordance with the invention, some parts being omitted in the interest of clarity.

Referring to the drawings there is shown in FIGURE 1 a side view of the facsimile recorder 1 incorporating a dryer mechanism 2 in accordance with the invention. The facsimile recorder 1 includes a housing 3 supporting a typical multi-stylli recording unit 4, a power supply 5, amplifiers and electrical equipment 6 and 7. In order to ventilate the housing 3, there is provided an exhaust fan 8, and an exhaust fan motor 9. If desired, the housing 3 may be fitted with a take up paper reel compartment 10.

The multi-stiyli recording unit 4 includes a paper storage compartment 11 containing a roll of electrolytic recording medium 12, end 13 of which is passed over a roller 14 between marking electrodes formed of linear electrode 15 and multi-styli electrode 16. After the electrolytic recording medium is marked between the electrodes 15 and 16, it passes between driven roller 17 and drive roller 18 and thence outwardly of the multi-styli recording unit 4 and over a corner pulley 19 to a platform 20 where the marked electrolytic recording paper is visible as indicated at 21. The drive roller 18 is rotated by a synchronous motor 18a operative when the recorder is in operation.

Operating equipment for the multi-styli recording unit 4 includes a heavy duty power supply 5, and amplifiers and other electrical control equipment positioned in the areas indicated at 6 and 7. Connection leads to the multi-styli recording unit 4 are provided as indicated at 22 and 23.

The dryer mechanism 2 includes a rack 30 of transversely extending electrical heating bars 31 positioned in arcuate arrangement with the centrally located bars 32 raised with respect to the end bars 33 and 34. A pair of lower rollers 35 and 36 are positioned one at each end of the heater bar rack 30, spaced therefrom and positioned at least slightly lower than the adjacent heater bars 33 and 34. A pair of upper rollers 37 and 38 are positioned one at each end of the heater bar rack 30 and located above and outwardly of the lower rollers 35 and 36. At least one of the rollers 35 and 36 is provided with reciprocal supporting means controlled by one or more reciprocal motor means or solenoids 40 so that the roller may be moved in the vertical direction upon actuation of the solenoid 40. A spring 41 is provided, if desired, so that the roller 35 is normally moved into the upward position as indicated in dotted lines on FIGURE 1 and in FIGURE 4. Alternatively the spring 41 may be omitted, and the roller 35 moved into the upper and lower positions by the solenoid 40.

The marked electrolytic recording medium 21 is passed over the roller 37 under the roller 35 across the surface of the heating bar rack 30, thence under the roller 36 and over the roller 38 between a pair of abutting rollers 44 and 45. Drive roller 44 is rotated by motor 46 while driven roller 45 is held against the surface of the marked electrolytic recording medium by means of a spring 47 or other suitable construction. If desired the recorded electrolytic recording medium 21 may be discharged from between the rollers 44 and 45 to the floor, or it may be passed over a roller 49 to a storage roll 50 positioned in the recorded paper storage compartment 10.

The movement of the electrolytic recording medium from the storage roll 12 past the marking electrodes 15 and 16 and through the drying mechanism 2 takes place because of the driving action of rollers 17 and 18 and the action of rollers 44 and 45. The driving motor 46 is a torque motor so constructed as to pull the paper through the recorder at the desired recording rate, which may be of the order of six hundred inches per minute, and at the position of non-recording, under reduced voltage, to provide sufficient torque so as to keep a predetermined amount of stress on the strip 21 so that upon the start of a recording operation there is no slack to be removed.

Figure 2:
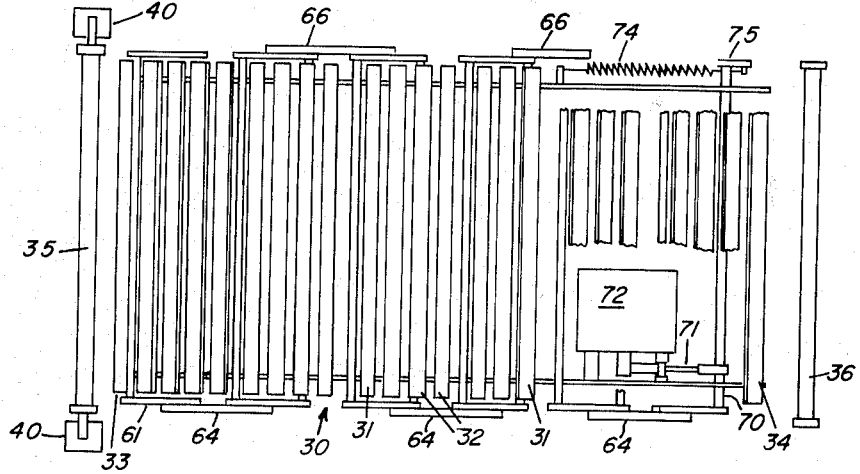
FIGURE 2 is a top view of the drying mechanism with portions of the heater bars shown broken away.
Figure 3:
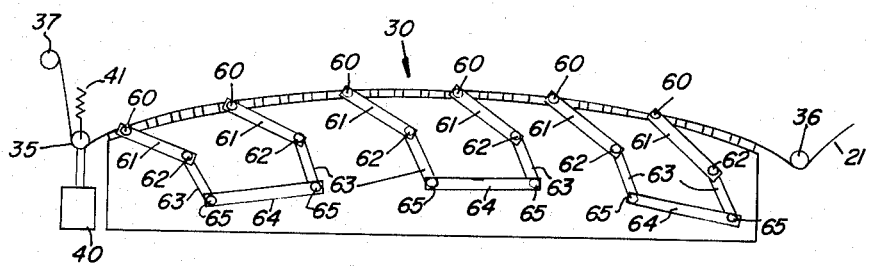
FIGURE 3 is a side view of the drying mechanism with the paper lifter shown retracted as in the operative position of the recorder.
Figure 4:
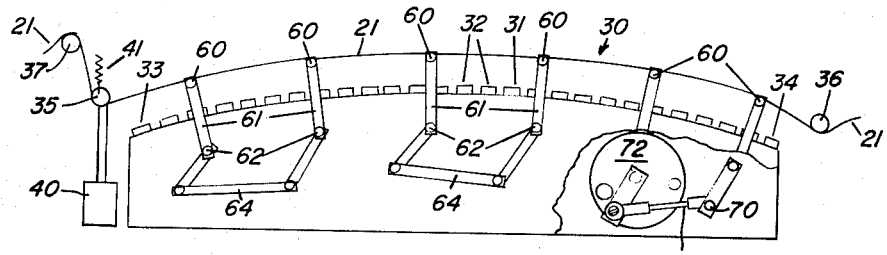
FIGURE 4 is a side view of the drying mechanism with the paper lifter shown raised as in the non-operative position of the recorder.

The paper lifting mechanism is best shown in FIGURES 2 through 4 and includes a plurality of lifter bars 60 interposed between heater bars 31 which may be slightly greater spaced so as to provide room for the lifter bars 60. The lifter bars 60 are fitted with supporting arms 61 which may be pivotably mounted as indicated at 62 and be continuous or made with extension arms 63. The extensions 63 may be tied together in pairs with linkage arms 64 through pivotable connection means 65. The linkage arms 64 may be positioned at one side of the rack 30 and linkage arms 66 on the other side of the heater rack 30 or the linkage arms 64 and 66 may be both positioned on the same side of the heater rack 30. However, it is believed that the alternate positioning of the linkage arms 64 and 66 provides a more balanced operation of the linkage mechanism and facilitates assembly.

In order to actuate the linkage arms a shaft 70 extends across the underside of the heater bar rack 30 and is fitted with a crank arm 71 connecting with reciprocal motor means such as a rotary solenoid 72. A suitable solenoid is made under the trademark "Ledex" by G. H. Leland Co., Dayton, Ohio. A spring 74 is connected through a crank arm 75 fixed to the shaft 70 and normally tending to turn the shaft 70 about forty-five degrees in a direction so as to raise the lifter bars 60 to the position shown in FIGURE 4. The rotary solenoid 72 is connected in parallel with the drive roller motor 46 so that upon the start of recording, as the strip of electrolytic recording medium 21 is drawn through the recorder, the solenoid 72 is energized to counteract the action of the spring 74 and cause the lifter bars 60 to be retracted into the spaces between the heater bars 31. Simultaneously the solenoid 40 is energized to counteract the action of the spring 41 and move the roller downwardly so that the strip of electrolytic recording medium 21 is maintained in contact with the heater bars 31 through 34 so as to be dried. Upon stopping of the recording the rotary solenoid 72 is first deenergized so that the lifter bars 60 are raised by the spring 74. Thereafter the solenoid 40 is deenergized and the spring 41 raises the roller 35.

Because of the high rate of the recorder, the heater bars 31 through 34 are of high wattage capacity, and thus produce a considerable amount of moisture saturated air resulting from the drying of the paper. Ventilation of the housing is accomplished by air drawn across the strip of electrolytic recording medium 21 while it is in contact with the heater rack 30. The air is then expelled through exhaust fan 8 and passed outwardly of the recorder through exhaust 84. Suitable portions 80 and 81 are provided to direct the air flow towards the electrolytic recording medium 21 for efficient drying thereof.

It will thus be seen that a drying mechanism has been provided of lightweight construction which automatically is operable upon failure of power to lift the recording medium away from contact with the heater bar. The construction is such that the recording medium remains taut during the lifting operation so that upon the start of recording there is a smooth operation of the recorder and the recording medium is prevented from sagging down on the heater bars.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

We claim:
1. A drying mechanism for a facsimile recorder using an electrolytic recording medium, the drying mechanism comprising a frame, a rack of electric heater bars extending transversely of the frame and positioned in arcuate arrangement with the centrally located bars raised with respect to the end bars, rollers carried by the frame for movement of the electrolytic recording medium over the heater bars including a pair of lower rollers, one of said lower rollers located at each end of the heater bar rack and positioned at least slightly lower than and spaced from the adjacent heater bars, a pair of upper rollers, each of said upper rollers located above and outwardly of each of said lower rollers, and paper lifter means including a plurality of lifter bars interposed between the heater bars and mounted for outward movement to lift the paper from the heater bars.

2. A drying mechanism for a facsimile recorder using an electrolytic recording medium, the drying mechanism comprising a frame, a rack of electrical heater bars extending transversely of the frame and positioned in arcuate arrangement with the centrally located bars raised with respect to the end bars, rollers carried by the frame for movement of the electrolytic recording medium over the heater bars including a pair of lower rollers, one of said lower rollers located at each end of the heater bar rack and positioned at least slightly lower than and spaced from the adjacent heater bars, a pair of upper rollers, each of said upper rollers located above and outwardly of each of said lower rollers, paper lifter means including a plurality of lifter bars interposed between the heater bars, pivoted supporting arms for the lifter bars, linkage means engaged between the supporting arms, and a rotary solenoid engaging the linkage means operative to move the lifter bars with respect to the heater bars.

3. A drying mechanism for a facsimile recorder using an electrolytic recording medium, the drying mechanism comprising a frame, a rack of electrical heater bars extending transversely of the frame and positioned in arcuate arrangement with the centrally located bars raised with respect to the end bars, rollers carried by the frame for movement of the electrolytic recording medium over the heater bars including a pair of lower rollers, one of said lower rollers located at each end of the heater bar rack and positioned at least slightly lower than and spaced from the adjacent heater bars, a pair of upper rollers, each of said upper rollers located above and outwardly of each of said lower rollers, paper lifter means including a plurality of lifter bars interposed between the heater bars, pivoted supporting arms for the lifter bars, linkage means engaged between the supporting arms, spring means tending to move the linkage means so as to raise the lifter arms above the heater bars, and a rotary solenoid engaging the linkage means operative to move the lifter bars against the action of said spring means with respect to the heater bars.

4. A drying mechanism for a facsimile recorder using an electrolytic recording medium, the drying mechanism comprising a frame, a rack of electric heater bars extending transversely of the frame and positioned in arcuate arrangement with the centrally located bars raised with respect to the end bars, rollers carried by the frame for movement of the electrolytic recording medium over the heater bars including a pair of lower rollers, one of said lower rollers located at each end of the heater bar rack spaced therefrom and positioned at least slightly lower than the adjacent heater bars, a pair of upper rollers, each of said upper rollers located above and outwardly of each of said lower rollers, paper lifter means including a plurality of lifter bars interposed between the heater bars, pivoted supporting arms for the lifter bars, linkage arms engaged between the supporting arms, spring means tending to move the linkage arms so as to raise the lifter arms above the heater bars, a rotary solenoid operative to move the linkage arms in opposition to said spring to lower the lifter arms between the heater bars, reciprocable supporting means for one of said lower rollers, and a solenoid for actuating said reciprocal supporting means for said lower roller, the solenoid controlled by said control means.

5. A drying mechanism for a facsimile recorder using an electrolytic recording medium, the drying mechanism comprising a frame, a rack of electric heater bars extending transversely of the frame and positioned in arcuate arrangement with the centrally located bars raised with respect to the end bars, rollers carried by the frame for movement of the electrolytic recording medium over the heater bars including a pair of lower rollers, one of said lower rollers located at each end of the heater bar rack spaced therefrom and positioned at least slightly lower than the adjacent heater bars, a pair of upper rollers, each of said upper rollers located above and outwardly of each of said lower rollers, a drive roller, a driven roller abutting the drive roller to pull the electrolytic recording medium therebetween, yieldable means urging the drive and the driven rollers together, motor actuated drive means for the driven roller, control means for the motor drive means, paper lifter means including a plurality of lifter bars interposed between the heater bars, pivoted supporting arms for the lifter bars, linkage arms engaged between the supporting arms, spring means tending to move the linkage arms so as to raise the lifter arms above the heater bars, and a rotary solenoid controlled by said control means operative to move the linkage arms in opposition to said spring to lower the lifter arms between the heater bars.

6. A drying mechanism for a facsimile recorder using an electrolytic recording medium, the drying mechanism comprising a frame, a rack of electric heater bars extending transversely of the frame and positioned in arcuate arrangement with the centrally located bars raised with respect to the end bars, rollers carried by the frame for movement of the electrolytic recording medium over the heater bars including a pair of lower rollers, one of said lower rollers located at each end of the heater bar rack spaced therefrom and positioned at least slightly lower than the adjacent heater bars, a pair of upper rollers, each of said upper rollers located above and outwardly of each of said lower rollers, a drive roller, a driven roller abutting the drive roller to pull the electrolytic recording medium therebetween, yieldable means urging the drive and the driven rollers together, motor actuated drive means for the driven roller, control means for the motor drive means, paper lifter means including a plurality of lifter bars interposed between the heater bars, pivoted supporting arms for the lifter bars, linkage arms engaged between the supporting arms, spring means tending to move the linkage arms so as to raise the lifter arms above the heater bars, a rotary solenoid controlled by said control means operative to move the linkage arms in opposition to said spring to lower the lifter arms between the heater bars, reciprocable supporting means for one of said lower rollers, and a solenoid for actuating said reciprocal supporting means for said lower roller, the solenoid controlled by said control means.

References Cited by the Examiner
UNITED STATES PATENTS

| | | | |
|---|---|---|---|
| 2,780,047 | 2/1957 | Vandamme et al. | 57—34 |
| 3,100,252 | 8/1963 | Shaler et al. | 219—471 |

RICHARD M. WOOD, *Primary Examiner.*